Patented Sept. 9, 1924.

1,507,559

UNITED STATES PATENT OFFICE.

HARRY ALFTHAN, OF MANTTA, FINLAND, ASSIGNOR TO G. A. SERLACHIUS AKTIE-BOLAGET, OF MANTTA, FINLAND, A CORPORATION OF FINLAND.

METHOD OF MANUFACTURING WHITE SULPHITE CELLULOSE FROM RESINOUS WOODS.

No Drawing.   Application filed October 18, 1923. Serial No. 669,301.

*To all whom it may concern:*

Be it known that I, HARRY ALFTHAN, a citizen of the Republic of Finland, residing at Mantta, Finland, have invented new and useful Improved Methods of Manufacturing White Sulphite Cellulose from Resinous Woods, of which the following is a specification.

Sulphite cellulose was hitherto generally produced by cooking pieces or chips of the spruce wood in a solution of calcium bisulphite. Many attempts has also been made to prepare sulphite pulp from fir and similar resinous woods but without success as the lye usually used in the sulphite process does not dissolve in a sufficient manner the resinous and ligneous substances of such woods.

This invention relates to an improved method of preparing white sulphite cellulose from fir and other resinous woods which results in a fully white product the quality of which is in every respect practically the same as that of sulphite cellulose prepared from spruce. This result is accomplished by a special preparation of the lye used in the boiling operation and further by a suitable adjusting of the pressure and temperature used during the boiling operation.

According to my present invention I perform the boiling of the resinous woods with a lye which contains besides calcium bisulphite and free sulfurous acid also sodium sulphite, the latter being generally present in its acid form (sodium bisulphite) on account of the excess of free sulfurous acid in the solution, and, furthermore, I perform the boiling operation at a somewhat higher pressure and somewhat lower temperature than those generally used in manufacturing sulphite pulp from spruce or similar white pines. Preferably a pressure of 5 to 6 atmospheres and an end temperature of 130 to 150° C. should be used. In certain cases sodium sulfate can be substituted for the sodium sulphite in the lye.

The preparation of the lye is preferably performed in the following manner. When the boiler has been filled with the pieces or chips of fir or similar resinous woods an aqueous solution of soda ash, caustic soda, or sodium sulfate is added in such quantity that the percentage of soda will be at most one per cent by weight counted on the cellulose contained in the wood chips. The boiler is then filled with a solution of calcium bisulphite containing in total from 3.5 to 4.5% of sulfur dioxide and from 0.8 to 1.5% sulfur dioxide combined with lime. The soda previously added reacts with the free sulfurous acid in the solution to form sodium sulphite or sodium bisulphite. Experiments with the common Scandinavian fir have shown that said lye can fully extract the resinous and ligneous substances from such wood if the pressure and temperature are regulated as above described.

I wish it understood that the addition of soda to the lye can be made outside the boiler and that the addition thereof can be made as sodium sulphite prepared from soda independently of the solution of calcium bisulphite. Also the quantity of soda used in the process can vary within wide limits dependent on the qualities of the resinous woods used as raw material.

What I claim is:—

1. Method of manufacturing white sulphite cellulose from fir and similar resinous woods, comprising preparing a lye containing in solution calcium bisulphite, a sodium salt and free sulfurous acid, and performing the boiling operation with said lye at a pressure of about 5 to 6 atmospheres and an end temperature of about 130 to 150° C.

2. Method of manufacturing white sulphite cellulose from fir and similar resinous woods, comprising preparing a lye containing in solution calcium bisulphite, sodium sulphite and free sulfurous acid and performing the boiling operation with said lye at a pressure of about 5 to 6 atmospheres and an end temperature of about 130 to 150° C.

3. Method of manufacturing white sulphite cellulose from fir and similar resinous woods, comprising mixing a solution of soda with a solution containing calcium bisulphite and free sulfurous acid, and performing the boiling operation of the resinous woods with said lye at a pressure of about 5 to 6 atmospheres and an end temperature about 130 to 150° C.

4. Method of manufacturing white sulphite cellulose from fir and similar resinous woods, comprising preparing a lye containing from 3.5 to 4.5% by weight of total sulfur dioxide, from 0.8 to 1.5% by weight of sulfur dioxide combined with lime, and at most 1% by weight of soda counted on the percentage of cellulose of the wood to be treated, and performing the boiling operation with said lye at a pressure of about 5 to 6 atmospheres and an end temperature of about 130 to 150° C.

In testimony whereof I have signed my name.

HARRY ALFTHAN.